US008516483B2

(12) United States Patent
Chinya et al.

(10) Patent No.: US 8,516,483 B2
(45) Date of Patent: Aug. 20, 2013

(54) TRANSPARENT SUPPORT FOR OPERATING SYSTEM SERVICES FOR A SEQUESTERED SEQUENCER

(75) Inventors: Gautham Chinya, Hillsboro, OR (US); Hong Wang, Fremont, CA (US); Richard A. Hankins, San Jose, CA (US); Shivnandan D. Kaushik, Portland, OR (US); Bryant Bigbee, Scottsdale, AZ (US); John Shen, San Jose, CA (US); Prashant Sethi, Folsom, CA (US); Baiju V. Patel, Portland, OR (US); John L. Reid, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2031 days.

(21) Appl. No.: 11/129,607

(22) Filed: May 13, 2005

(65) Prior Publication Data

US 2006/0271932 A1 Nov. 30, 2006

(51) Int. Cl.
*G06F 9/46* (2006.01)
(52) U.S. Cl.
USPC .......................................... 718/100
(58) Field of Classification Search
USPC .......................................... 718/102
See application file for complete search history.

(56) References Cited

U.S. PATENT DOCUMENTS

| | | | |
|---|---|---|---|
| 5,526,485 A * | 6/1996 | Brodsky | 714/38 |
| 5,630,128 A * | 5/1997 | Farrell et al. | 718/103 |
| 6,587,860 B1 * | 7/2003 | Chandra et al. | 707/202 |
| 6,651,163 B1 * | 11/2003 | Kranich et al. | 712/244 |
| 6,865,738 B2 | 3/2005 | Mathiske et al. | |
| 7,065,633 B1 * | 6/2006 | Yates et al. | 712/227 |
| 2004/0002974 A1 * | 1/2004 | Kravitz et al. | 707/8 |

FOREIGN PATENT DOCUMENTS

| WO | WO 2005/022384 | 3/2005 |
|---|---|---|
| WO | 2006/124750 A1 | 11/2006 |

OTHER PUBLICATIONS

U.S. Appl. No. 10/816,103, filed Mar. 31, 2004—Multithreading Architecture Extension.
U.S. Appl. No. 11/026,597, filed Dec. 30, 2004—Software Methodology and Algorithms for Supporting User-Level Multithreading and Asymmetric Cores in Multi-Sequencer Systems.
U.S. Appl. No. 60/640,425, filed Dec. 30, 2004—A Mechanism for Instruction Set Based Thread Execution on a Plurality of Instruction Sequences.
International Preliminary Report on Patentability for PCT Patent Application No. PCT/US2006/018684 mailed on Nov. 22, 2007, 8 pages.
Vasileios et al: "Nanothreads vs. Fibers for the Support of Fine Grain Parallelism on W i ndows NT/2000 Platforms" Lecture Notes in Computer Science, [Ont i ne] vol. 1940, 2000, pp. 146-159, URL: h t t p : / / c i teseer. i s t .psu.edu/432711.htm.

(Continued)

*Primary Examiner* — Emerson Puente
*Assistant Examiner* — Gregory A Kessler
(74) *Attorney, Agent, or Firm* — Caven & Aghevli LLC (57) ABSTRACT

Operating system services are transparently triggered for thread execution resources ("sequencers") that are sequestered from view of the operating system. A "surrogate" thread that is managed by, and visible to, the operating system is utilized to acquire OS services on behalf of a sequestered sequencer. Multi-shred contention for shred-specific resources may thus be alleviated. Other embodiments are also described and claimed.

26 Claims, 9 Drawing Sheets

(56) References Cited

OTHER PUBLICATIONS

Dubois et al: "Assisted Execution" Technical Report, Department of EE-Systems, University of Southern California, [Online] Oct. 1998 (1998-lo), pp. 1-25, URL: h t t p : / / c i teseer. i s t . psu. edu/dubois98assisted. html p. 3-p. 15.

Redstone J et al: "Mini-threads: increasing TLP on small-scale SMT processors" High-Performance Computer Architecture, 2003. HPCA-9 2003. Proceedings. The Ninth International Symposium on Feb. 8-12, 2003, Piscataway, NJ, USA,IEEE, Feb. 8, 2003, pp. 19-30.

Goel S Et Al: "Distributed Scheduler for High Performance Datacentric Systems" IEEE Tencon 2003. Conference on Convergent Technologies for The Asia-pacific Region. Bangalore, India, Oct. 15-17, 2003, IEEE Region 10 Annual Conference, New York, Ny : Ieee, vol. vol. 4 of 4. Conf. 18, Oct. 15, 2003, pp. 1157-1161.

Dongkeun Kim et al: "Physical experimentation w i t h prefetching helper threads on Intel's hyper-threaded processors" Code Generation and Optimization, 2004. Cgo 2004. International Symposium on San Jose, Ca, Usa Mar. 20-24, 2004, Piscataway, NJ, USA, IEEE, Mar. 20, 2004, pp. 27-38.

PCT/US2006/018684—International Search Report Mailed Sep. 11, 2006.

Notice of Allowance Received for Chinese Patent Application No. 200680016118.7, mailed on Jun. 27, 2011, 2 pages of Notice of Allowance and 2 page of English translation.

Notice of Allowance Received for Korean Patent Application No. 2007-7026304, mailed on Jun. 30, 2010, 2 pages of Notice of Allowance and 1 page of English translation.

Office Action received for Chinese Patent Application No. 2006800161187, mailed on Nov. 14, 2008, 5 pages of Office Action and 3 pages of English Translation.

Office Action received for Chinese Patent Application No. 2006800161187, mailed on Oct. 9, 2009, 8 pages of Office Action and 6 pages of English Translation.

Office Action received for EP Patent Application No. 06752542.8, mailed on Feb. 18, 2009, 6 pages.

Office Action received for Korean Patent Application No. 20077026304, mailed on Mar. 20, 2009, 5 pages of English Translation only.

* cited by examiner

TRANSPARENT SUPPORT FOR OPERATING SYSTEM SERVICES FOR A SEQUESTERED SEQUENCER

BACKGROUND

1. Technical Field

The present disclosure relates generally to information processing systems and, more specifically, to embodiments of techniques for supporting operating system ("OS") services for a sequestered sequencer in a multi-sequencer multithreading system.

2. Background Art

In order to increase performance of information processing systems, such as those that include microprocessors, both hardware and software techniques have been employed. On the hardware side, microprocessor design approaches to improve microprocessor performance have included increased clock speeds, pipelining, branch prediction, superscalar execution, out-of-order execution, and caches. Many such approaches have led to increased transistor count, and have even, in some instances, resulted in transistor count increasing at a rate greater than the rate of improved performance.

Rather than seek to increase performance strictly through additional transistors, other performance enhancements involve software techniques. One software approach that has been employed to improve processor performance is known as "multithreading." In software multithreading, an instruction stream may be divided into multiple instruction streams that can be executed in parallel. Alternatively, multiple independent software streams may be executed in parallel.

In one approach, known as time-slice multithreading or time-multiplex ("TMUX") multithreading, a single processor switches between threads after a fixed period of time. In still another approach, a single processor switches between threads upon occurrence of a trigger event, such as a long latency cache miss. In this latter approach, known as switch-on-event multithreading ("SoEMT"), only one thread, at most, is active at a given time.

Increasingly, multithreading is supported in hardware. For instance, in one approach, processors in a multi-processor system, such as a chip multiprocessor ("CMP") system, may each act on one of the multiple software threads concurrently. In another approach, referred to as simultaneous multithreading ("SMT"), a single physical processor is made to appear as multiple logical processors to operating systems and user programs. For SMT, multiple software threads can be active and execute simultaneously on a single processor without switching. That is, each logical processor maintains a complete set of the architecture state, but many other resources of the physical processor, such as caches, execution units, branch predictors, control logic and buses are shared. For SMT, the instructions from multiple software threads thus execute concurrently on each logical processor.

For a system that supports concurrent execution of software threads, such as SMT and/or CMP systems, an operating system application may control scheduling and execution of the software threads on thread execution resource(s). The operating system may also supply certain services, such as synchronization objects and structured exception handling, for the threads that it controls.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of a systems, methods and mechanisms to provide transparent support of certain OS services for a sequestered sequencer.

DETAILED DESCRIPTION

The following discussion describes selected embodiments of methods, systems and mechanisms to transparently trigger operating system services for thread execution resources ("sequencers") that are sequestered from view of the operating system. The mechanism and method embodiments described herein may be utilized with single-core or multi-core multithreading systems. In the following description, numerous specific details such as processor types, multithreading environments, system configurations, data structures and specific operating system services have been set forth to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring the present invention.

Figure 1:
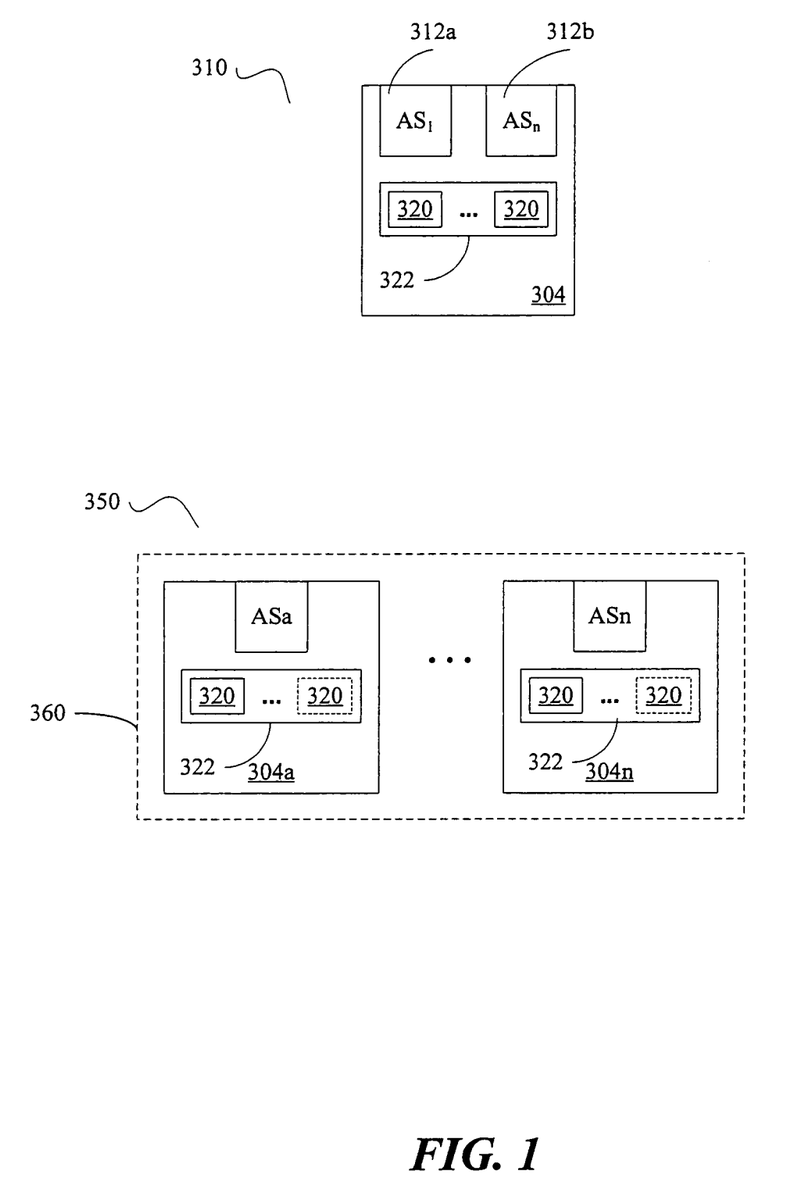
FIG. 1 is a block diagram illustrating various embodiments of multi-sequencer systems.

FIG. 1 is a block diagram illustrating selected hardware features of embodiments 310, 350 of a multi-sequencer system that supports user-level control of threads. FIG. 1 illustrates selected hardware features of an SMT multi-sequencer multithreading environment 310. FIG. 1 also illustrates selected hardware features of a multiple-core multithreading environment 350, where each sequencer is a separate physical processor core.

In the SMT environment 310, a single physical processor 304 is made to appear as multiple logical processors (not shown), referred to herein as $LP_1$ through $LP_n$, to operating systems and user programs. Each logical processor $LP_1$ through $LP_n$ maintains a complete set of the architecture state $AS_1$-$AS_n$, respectively. The architecture state 312a, 312b includes, for at least one embodiment, data registers, segment registers, control registers, debug registers, and most of the model specific registers.

The logical processors $LP_1$-$LP_n$ share most other resources of the physical processor 304, such as caches, execution units, branch predictors, control logic and buses. Although such features may be shared, each thread context in the multithreading environment 310 can independently generate the next instruction address (and perform, for instance, a fetch from an instruction cache, an execution instruction cache, or trace cache).

Thus, the processor 304 includes logically independent next-instruction-pointer and fetch logic 320 to fetch instructions for each thread context, even though the multiple logical sequencers may be implemented in a single physical fetch/decode unit 322. For an SMT or embodiment, the term "sequencer" encompasses at least the next-instruction-pointer and fetch logic 320 for a thread context, along with at least some of the associated architecture state, AS, for that thread context. It should be noted that the sequencers of an SMT system 310 need not be symmetric. For example, two SMT sequencers for the same physical core may differ in the amount of architectural state information that they each maintain.

Thus, for at least one embodiment, the multi-sequencer system 310 is a single-core processor 304 that supports concurrent multithreading. For such embodiment, each sequencer is a logical processor having its own next-instruction-pointer and fetch logic and its own architectural state information, although the same physical processor core 304 executes all thread instructions. For such embodiment, the logical processor maintains its own version of the architecture state, although execution resources of the single processor core 304 may be shared among concurrently-executing threads.

FIG. 1 also illustrates at least one embodiment of a multi-core multithreading environment 350. Such an environment 350 includes two or more separate physical processors 304a-304n that are each capable of executing a different thread/shred such that execution of at least portions of the different threads/shreds may be ongoing at the same time. Each processor 304a through 304n includes a physically independent fetch unit 322 to fetch instruction information for its respective thread or shred. In an embodiment where each processor 304a-304n executes a single thread/shred, the fetch/decode unit 322 implements a single next-instruction-pointer and fetch logic 320. However, in an embodiment where each processor 304a-304n supports multiple thread contexts, the fetch/decode unit 322 implements distinct next-instruction-pointer and fetch logic 320 for each supported thread context. The optional nature of additional next-instruction-pointer and fetch logic 320 in a multiprocessor environment 350 is denoted by dotted lines in FIG. 1.

Accordingly, for at least one embodiment of the multi-core system 350 illustrated in FIG. 1, each of the sequencers may be a processor core 304, with the multiple cores 304a-304n residing in a single chip package 360. Each core 304a-304n may be either a single-threaded or multi-threaded processor core. The chip package 360 is denoted with a broken line in FIG. 1 to indicate that the illustrated single-chip embodiment of a multi-core system 350 is illustrative only. For other embodiments, processor cores of a multi-core system may reside on separate chips.

For ease of discussion, the following discussion focuses on embodiments of the multi-core system 350. However, this focus should not be taken to be limiting, in that the mechanisms described below may be performed in either a multi-core or single-core multi-sequencer environment.

Figure 2:
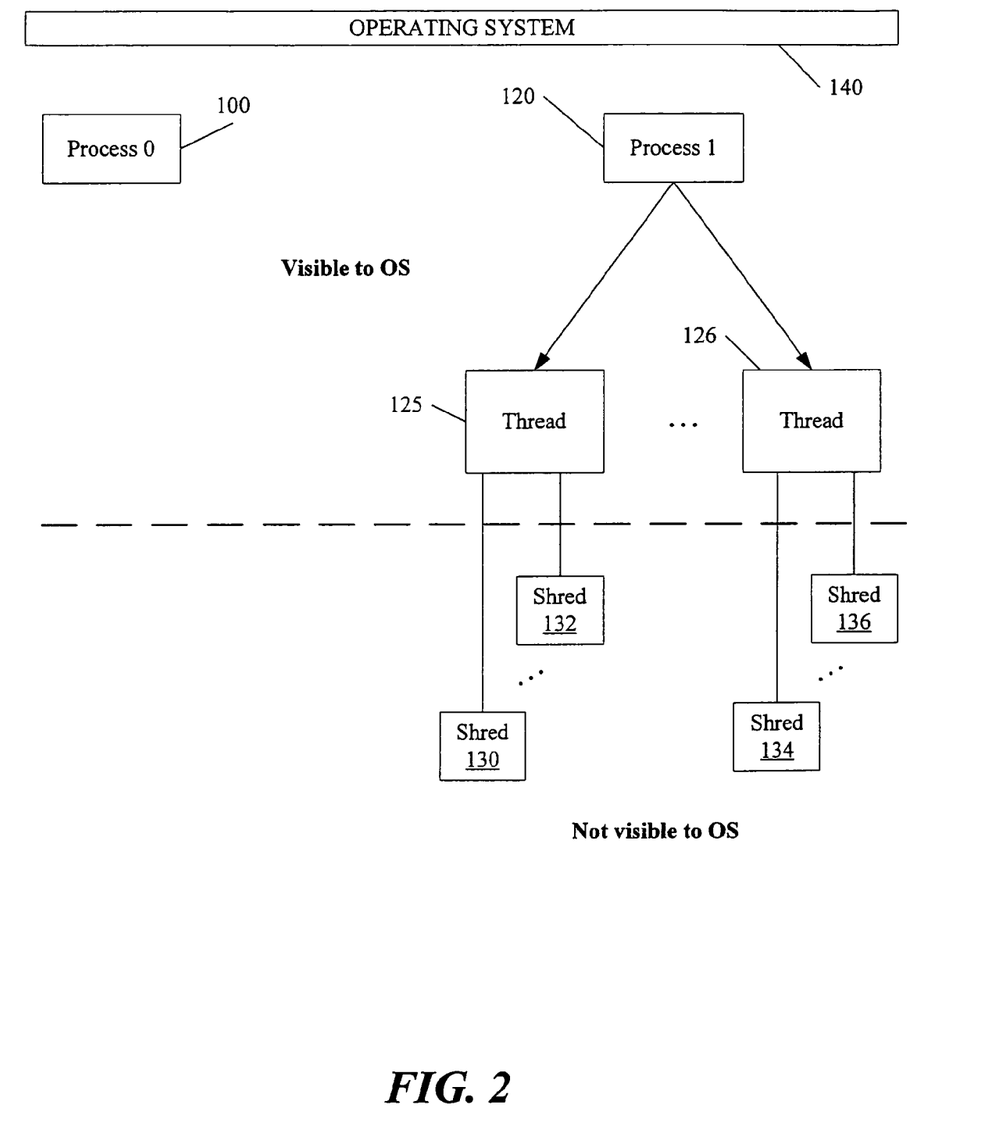
FIG. 2 is a block diagram presenting a graphic representation of a parallel programming approach for a multi-sequencer system.

FIG. 2 is a block diagram illustrating a graphic representation of a parallel programming approach on a multi-sequencer multithreading system. A shared-memory multiprocessing paradigm may be used in an approach referred to as parallel programming. According to this approach, an application programmer may split a software program, sometimes referred to as an "application" or "process," into multiple threads to be run concurrently in order to express parallelism for a software program. All threads of the same software program ("process") share a common logical view of memory.

FIG. 2 illustrates processes 100, 120 visible to an operating system 140. These processes 100, 120 may be different software application programs, such as, for example, a word processing program and an email management program. Commonly, each process operates in a different address space.

The operating system ("OS") 140 is commonly responsible for managing the user-created tasks for a process, such as process 120. Accordingly, the operating system 140 may create a distinct thread 125, 126 for each of the user-defined tasks associated with a process 120, and may map the threads 125, 126 to thread execution resources. The OS 140 is commonly responsible for scheduling these threads 125, 126 for execution on the execution resources. The threads associated with a single process typically have the same view of memory and have visibility to each others' virtual address space.

Because the OS 140 is responsible for creating, mapping, and scheduling threads, the threads 125, 126 are "visible" to the OS 140. In addition, embodiments of the present invention comprehend additional threads 130-136 that are not visible to the OS 140. That is, the OS 140 does not create, manage, or otherwise acknowledge or control these additional threads 130-136. These additional threads, which are neither created nor controlled by the OS 140, are sometimes referred to herein as "shreds" 130-136 in order to distinguish them from OS-visible threads. The shreds may be created, managed and otherwise controlled by user-level programs and may be scheduled, with full OS transparency, to run on sequencers that are sequestered from the operating system. (The OS-sequestered sequencers are sometimes referred to herein as "OS-invisible.") The OS-sequestered sequencers share the same ring 0 state as OS-visible sequencers. Shreds thus share the same execution environment (address map) that is created for the threads associated with the same process.

An OS-invisible shred may be generated by instructions (coded, for example, by an application programmer) that are executed by an OS-visible thread. Accordingly, a shred may be invisible to an operating system but may be associated with a thread that is OS-visible. The OS-visible thread may be scheduled by an OS scheduler to run on a sequencer visible to the OS, whereas the shred may be scheduled by an OS-independent user application or a runtime routine.

FIG. 2 illustrates that a system for at least one embodiment of the present invention may support a 1-to-many relationship between an OS-visible thread, such as thread 125, and the shreds 130-136 (which are not visible to the OS) associated with the thread. The shreds are not "visible" to the OS (see 140, FIG. 2) in the sense that a programmer, not the OS, may employ user-level techniques to create, synchronize and otherwise manage and control operation of the shreds. While the OS 140 is aware of, and controls, a thread, the OS 140 is not aware of, and does not manage or control, shreds. Additionally, there are no OS-specific data structures associated with these shreds as the shreds are not managed by the OS.

Thus, instead of relying on the operating system to manage the mapping between thread unit hardware and shreds, for at least one embodiment a user may directly control such mapping and may directly manipulate control and state transfers associated with shred execution. The shred control instructions may allow OS-transparent manipulation of control and state transfers for multiple thread units.

For at least one embodiment, a shred is generated via a user instruction or "primitive" that invokes a software library or other OS-independent mechanism for generating a shred that the OS is not aware of. For example, a shred may be generated in response to a user-level software library call. A further discussion of user-level shredding instructions may be found in copending patent application U.S. patent Ser. No. 11/173, 326, filed Jun. 30, 2005, entitled "A Mechanism For Instructions Set-Based Thread Execution on a Plurality of Instruction Sequencers."

As used herein, a thread unit, also interchangeably referred to herein as a "sequencer", may be any physical or logical unit capable of executing a thread or shred. It may include next instruction pointer logic to determine the next instruction to be executed for the given thread or shred. For example, the OS thread 125 illustrated in FIG. 2 may execute on one sequencer, not shown, while each of the active shreds 130-136 may execute on other sequencers (also not shown).

Figure 3:
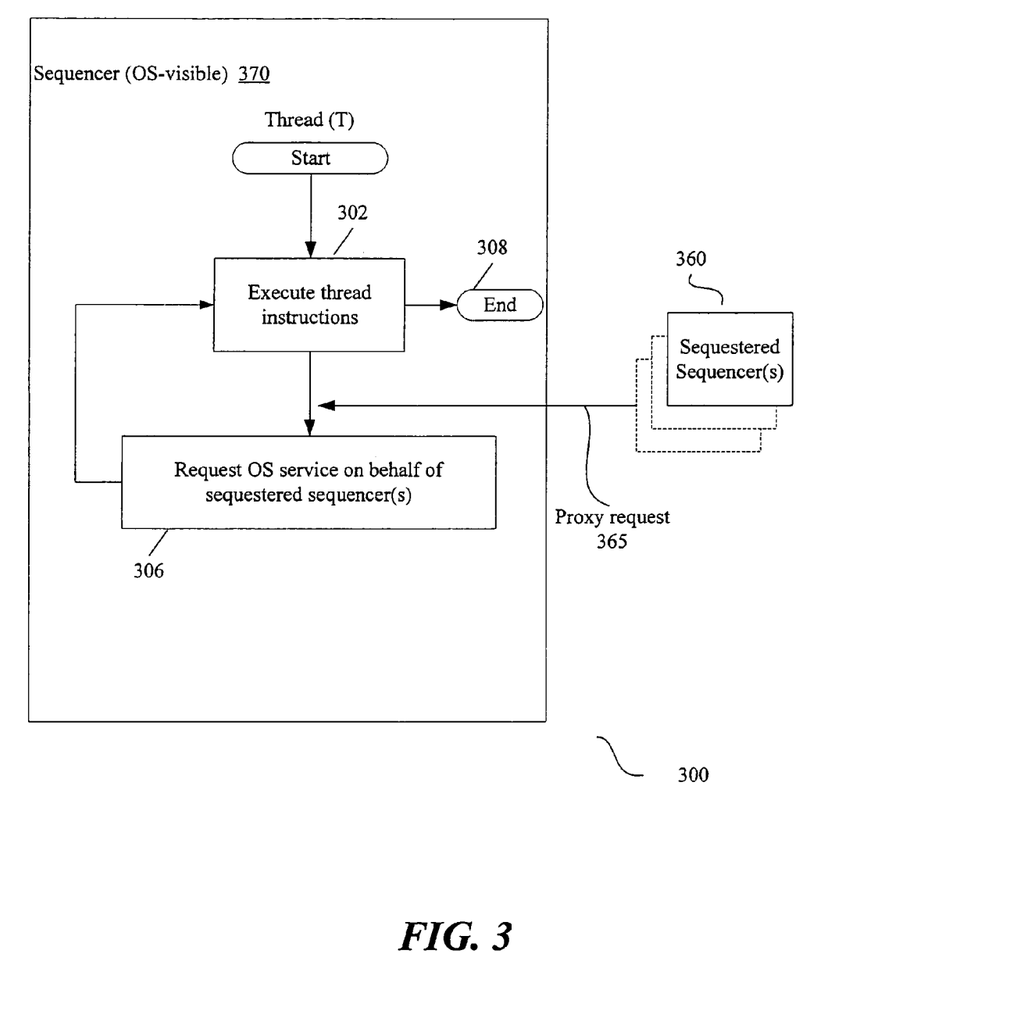
FIG. 3 is a flow diagram illustrating at least one embodiment of a shred proxy execution mechanism.

FIG. 2 is now further discussed with reference to FIG. 3. FIGS. 2 and 3 illustrate at least one embodiment of a user-level multithreading environment. For such embodiment, code that runs on an OS-sequestered sequencer 360 shares the execution environment that is created by the OS to run a thread, T, on the associated OS-visible sequencer 370. For at least one embodiment of such environment, the code that runs on OS-sequestered sequencers 360 cannot directly access OS services. For system-level events, such as system calls and certain exceptions, a proxy may allow an OS-invisible shred to receive service for such events from an operating system 140.

Such services may be provided, for at least one embodiment, by a proxy mechanism. That is, a multi-shredding system may support an OS-transparent proxy mechanism to allow events on an OS-sequestered sequencer to be handled by the operating system.

FIG. 3 is a flow diagram illustrating proxy execution, by a main thread T, to accomplish OS-provided service for a shred associated with the main thread. The shred may be executing on any of one or more sequestered sequencer(s) 360. As used herein the term proxy execution refers to inter-sequencer shred migration for the duration required to carry out the service—the transfer of control and state information from a sequestered sequencer to an OS-visible sequencer so that the OS-visible sequencer may trigger an operating system to provide service on behalf of the sequestered sequencer.

Proxy execution is therefore a means by which the OS-visible sequencer may get the attention of the operating system to provide OS-supported service for a shred on a sequestered sequencer. Proxy execution may be utilized to present an illusion of architectural symmetry to an application programmer on a system that includes asymmetric sequencers.

FIG. 3 illustrates that any time that one of the OS-sequestered sequencer(s) 360 desires an OS-supported service, such as acquiring a lock on a synchronization object or registration of a callback function for structured exception handling, a request 365 is sent to the "appropriate" thread on an OS-visible sequencer 370. For example, the request 365 may be a signal to indicate that the shred has attempted to acquire a lock on a synchronization object managed by the operating system. Or, for example, the request 365 may be a signal to indicate that the shred has attempted to write to a user-level exception-handling structure maintained by the operating system.

The appropriate OS-visible sequencer 370 is the sequencer running the thread T, whose logical view of memory the requesting shred shares. The thread, T, may execute 302 on the OS-visible sequencer 370 and may be interrupted when the proxy request 365 is received. The OS-visible 370 sequencer may either immediately handle the request, or may log it for later handling. When the request is handled by the OS-visible sequencer 370, the sequencer 370 may request 306 the OS service on behalf of the shred running on the requesting sequencer 360.

The sequencer 370 may then resume execution of the thread, T, instructions at block 302 until the thread terminates at block 308 (or until it is interrupted with another proxy request).

The proxy method 300 illustrated in FIG. 3 thus may be utilized to produce for the sequestered sequencer(s) 360 an asynchronous transfer of control from the sequestered sequencer 360 to an OS-visible sequencer 370 when certain OS services are desired.

The OS services are requested on behalf of the sequestered sequencer 360 by a thread T that runs on the OS-visible sequencer 370 such that the OS-visible sequencer 370 gains the attention of the operating system in order to provide the service that has been requested by the sequestered sequencer 360. The proxy mechanism thus allows an OS-visible sequencer 370 to impersonate a shred in order to get the attention of the operating system for a service desired by the shred.

The proxy method 300 may be implemented in any number of manners. For example, such method 300 may be invoked implicitly when a sequestered sequencer 360 attempts to perform a privileged instruction, such as a system call, on an OS-sequestered sequencer. The attempted system call may cause an exception to be generated. The handler for the exception may save the shred state and generate the request 365 signal to the OS-sequestered sequencer 370. As is mentioned above, the OS-sequestered sequencer 370 may immediately service the exception via proxy execution, or may log the exception and delay servicing. In either case, the sequencer 370 may save its own state before obtaining the shred's state and invoking the operating system to obtain the desired service.

It should be noted that the sequencers of a system capable of performing embodiments of techniques disclosed herein need not be symmetric. Sequencers may differ in any manner, including those aspects that affect quality of computation. For example, the sequencers may differ in terms of power consumption, speed of computational performance, functional features, or the like.

By way of example, for one embodiment, the sequencers may differ in terms of functionality. The example of functional asymmetry illustrated in FIGS. 2 and 3 shows that at least one sequencer 370 may be visible to the OS (see, for example, 140 of FIG. 2) and may therefore be capable of performing "ring 0" operations such as performing system calls, servicing a page fault, registering call back functions, and the like. On the other hand, one or more other sequencers 360 may be sequestered from the OS, and therefore be incapable of performing ring 0 operations. However, this is just one example of functional symmetry. The sequencers of a multi-sequencer system may also differ in any other manner, such as dimensions, word and/or data path size, topology, memory, power consumption, number of functional units, communication architectures (multi-drop bus vs. point-to-point interconnect), or any other metric related to functionality, performance, footprint, or the like.

To recap, FIG. 3 thus illustrates a user-level multithreading environment that includes a proxy mechanism 300 so that an OS-visible sequencer 370 may invoke operating system service for a shred executing on a sequestered sequencer 360. One specific type of such operating system service may include acquisition of a lock on an OS-provided synchronization object. One other example of such operating system service may include registration of a callback function.

Surrogate Threads

In order to invoke these and other operating system services for OS-invisible shreds, surrogate threads may be used. A surrogate thread is an OS-visible thread, created by a main thread, that acts as a service agent for a shred when the shred desires OS service. Surrogate threads may be particularly useful for handling OS-related services when the service involves a thread-specific resource that is potentially subject to multi-shred contention.

Figure 4:
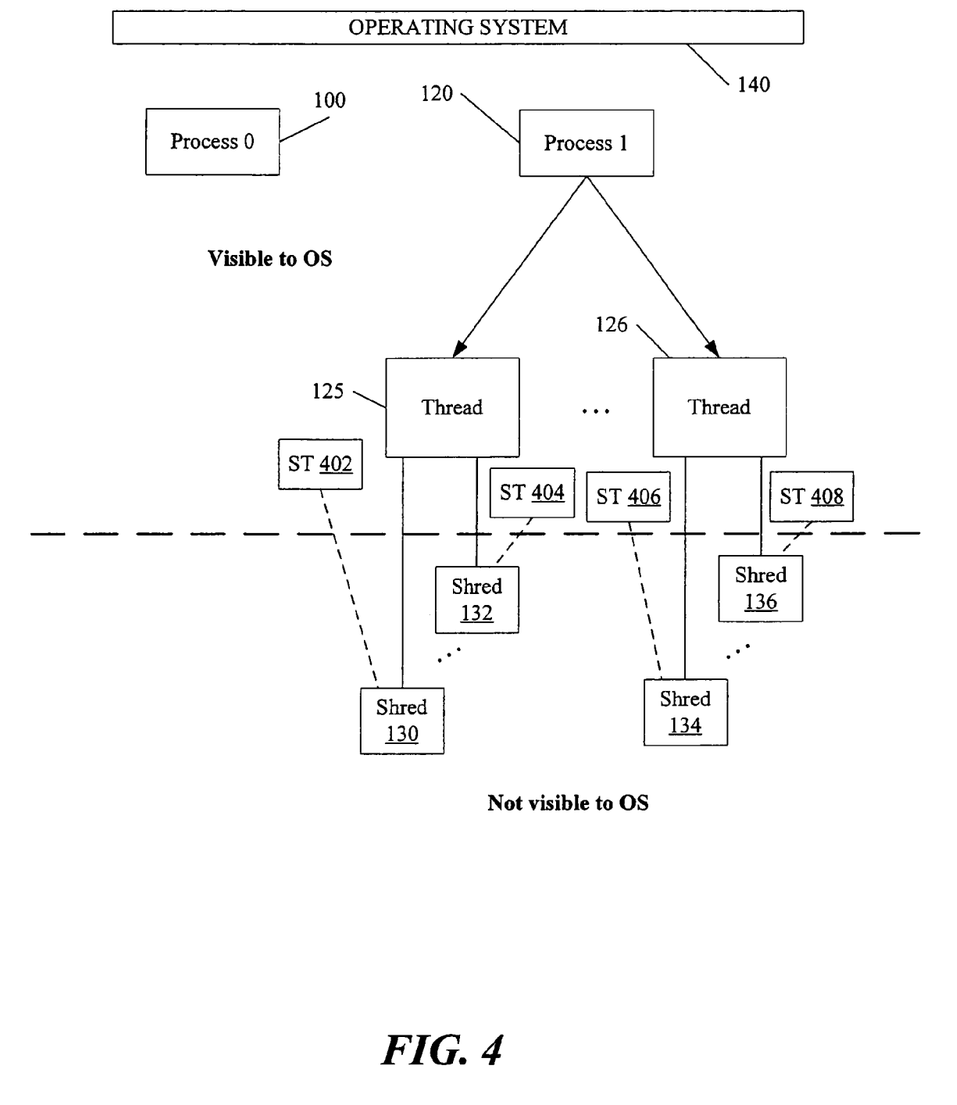
FIG. 4 is a block diagram presenting a graphic representation of a general parallel programming approach for a multi-sequencer system that utilizes surrogate threads.

FIG. 4 is a block diagram illustrating a general parallel programming approach for a multi-sequencer system that supports surrogate threads such as surrogate threads 402, 404, 406, 408. (Like elements in FIGS. 2 and 4 bear like reference numerals.) The surrogate threads 402-408 may be created by the application-writer to handle certain exceptions, system calls, callback registration, and other proxy services on behalf of a shred. For at least one embodiment, the application programmer may elect to generate, via instructions in a main thread program, a surrogate thread at the same time that a shred is initialized to share the execution environment of the main thread program. In another embodiment surrogate threads, one per shred, could be generated "lazily" only when needed, delaying, in the worst case, and perhaps reducing, in the best case, OS resources used to maintain a symmetric programming environment.

FIG. 4 illustrates that surrogate threads 402-408 are visible to the OS 140 (that is, they run on OS-visible sequencers). They may therefore be scheduled to run by the OS 140.

Figure 5:
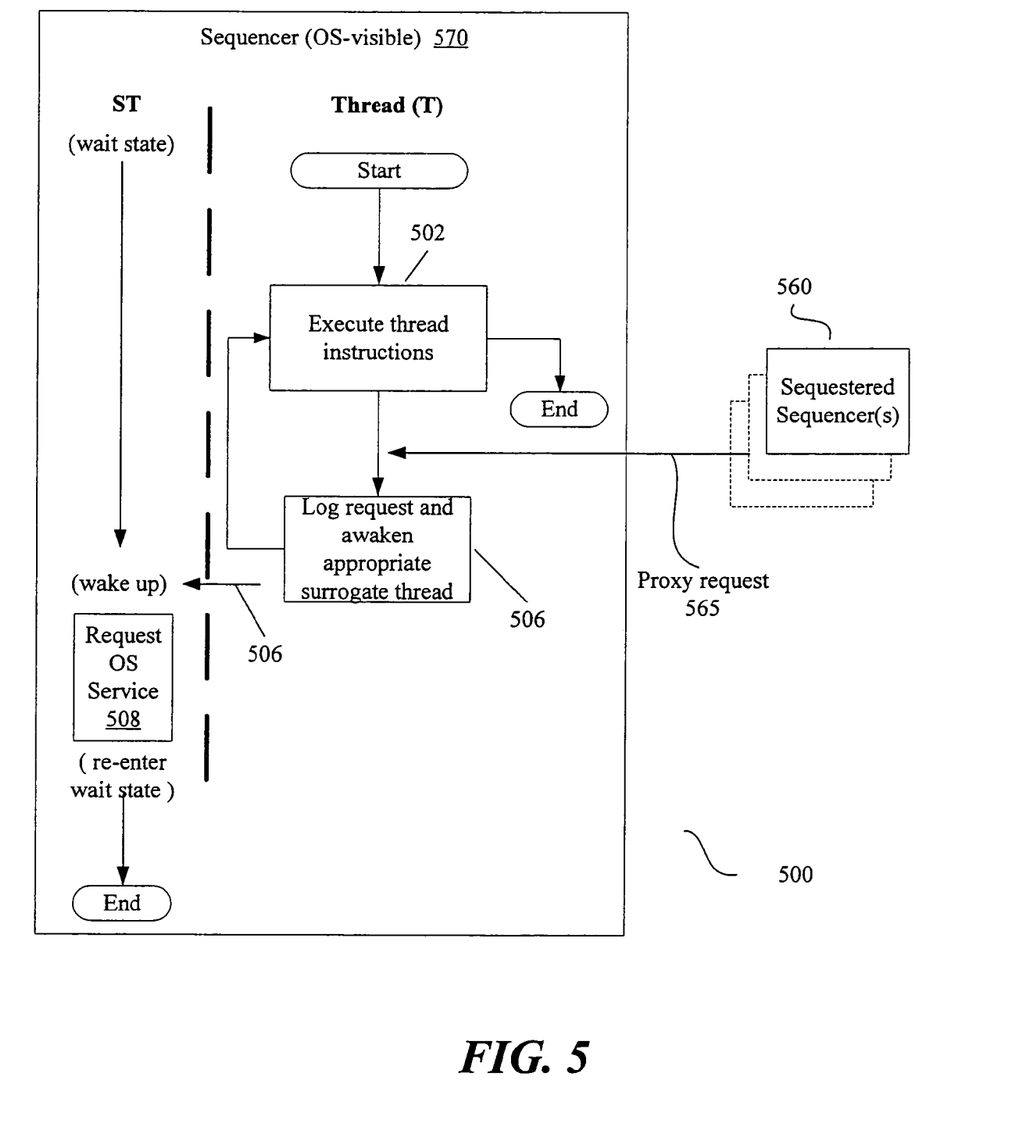
FIG. 5 is a control flow diagram illustrating at least one embodiment of a shred proxy execution mechanism that utilizes surrogate threads.

FIG. 5 is a flow diagram that illustrates that a surrogate thread may be utilized to provide proxy execution for a shred. Generally, FIG. 5 illustrates that a proxy request 565 may be delivered to the OS-visible sequencer 570 when a shred on a sequestered sequencer 560 desires a service of the OS (see 140, FIG. 2). The main thread, T, associated with the shred may execute 502 on the OS-visible sequencer 570 until it is interrupted by the request 565. If such a request is received, the thread T executes block 506.

FIG. 5 illustrates that, at block 506, the thread T logs the event. Rather than performing the proxy execution itself, the main thread T instead wakes 507 the surrogate thread associated with the requesting shred.

For at least one embodiment, a surrogate thread remains in a "wait" state most of the time. A surrogate thread, such as ST illustrated in FIG. 5, is invoked 507 by the main thread, T, into an active state ("awakened") to perform 508 proxy execution when certain OS services are requested by its associated shred. When the surrogate thread ST has completed its proxy execution 508, it re-enters the wait state.

Accordingly, a surrogate thread ST may be used to perform proxy execution to invoke operating system services on behalf of an OS-invisible shred. The surrogate thread ST allow the shred to receive OS service in a way that is transparent to the OS—the OS is not aware of the shreds. The use of surrogate threads in this manner may be particularly useful for allowing OS-invisible shreds access to a certain type of OS service. That is, surrogate threads may be utilized to allow shreds to gain access to any OS services that involve a single per-thread resource that may be subject to multi-shred contention. Two particular examples of the use of surrogate threads to allow shreds access to an OS service that is subject to multi-shred contention include the use of surrogate threads for synchronization services and for structured exception handling. The use of surrogate threads for synchronization services is discussed in further detail below. However, such example should not be taken to be limiting. The surrogate thread techniques discussed herein may be utilized to transparently allow shreds access to any OS service that involves a per-thread resource that would otherwise be subject to multi-shred contention.

Figure 6:
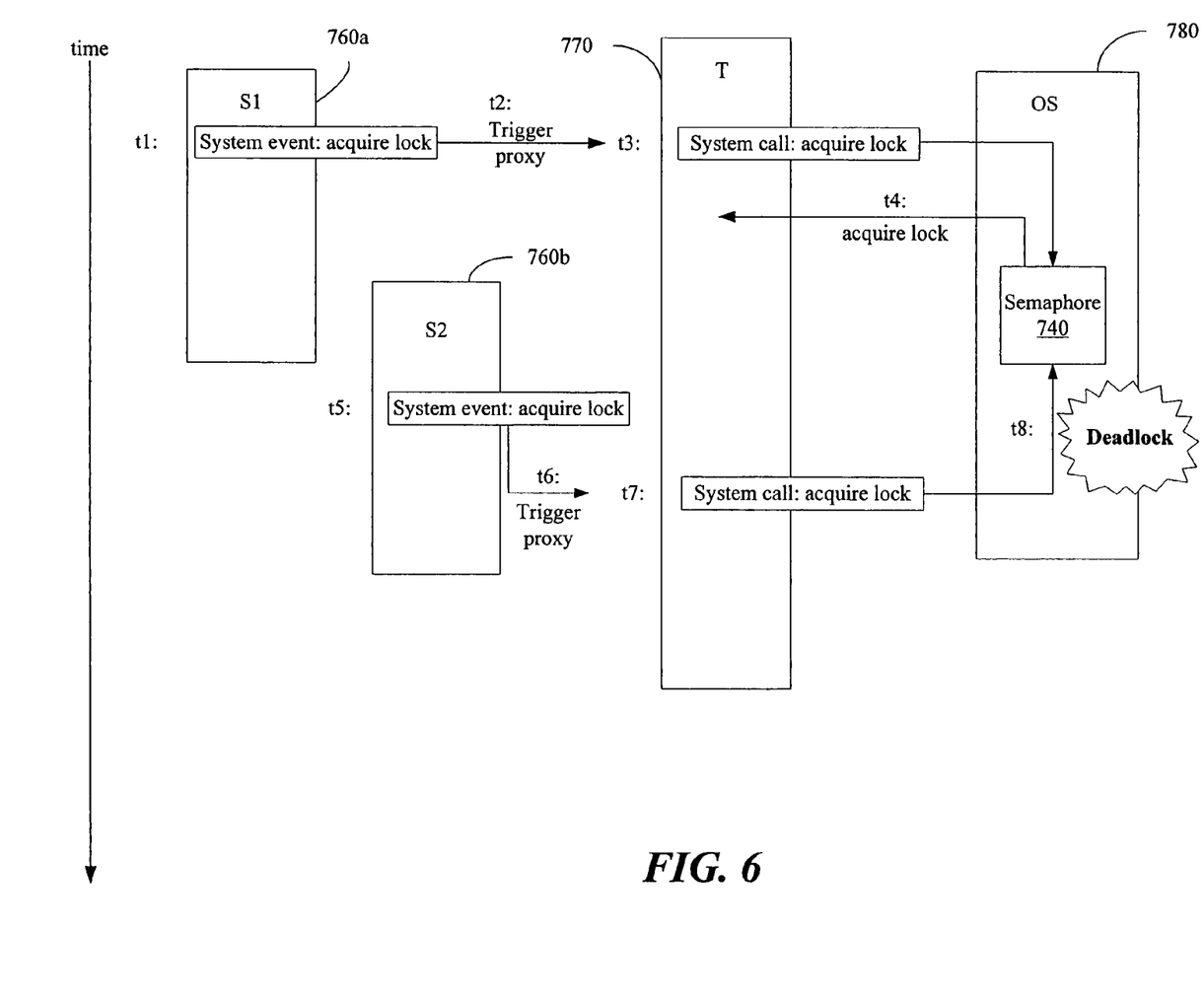
FIG. 6 is a timing diagram that sets forth an illustrative example of a type of deadlock that can be incurred as a result of multi-shred contention for a thread-specific resource.

FIG. 6 is a timing diagram that sets forth an illustrative example of a type of deadlock that may be avoided in an asymmetric multi-sequencer system through the use of surrogate threads. This type of deadlock can be incurred as a result of shred use of an OS-provided synchronization object. The deadlock scenario illustrated in FIG. 6 is similar to the deadlock scenario that might happen if a thread attempts to acquire a lock that is already held from inside a critical section of code.

The example illustrated in FIG. 6 assumes asymmetry among sequencers 760a, 760b, 770 of a multi-sequencer system. FIG. 6 illustrates two sequestered sequencers 760a and 760b, each of which is executing a shred instruction stream, S1 and S2, respectively. Each of the shreds S1 and S2 are associated with the same thread, T. FIG. 6 illustrates thread T as running on sequencer 770 that is visible to an operating system 780.

FIG. 6 illustrates that, at time t1, the first sequestered sequencer 760a attempts to make a system call in order to acquire a semaphore 740 (or any other type of OS-provided synchronization object). For purposes of the example illustrated in FIG. 6, it is assumed that the semaphore 740 is not currently locked at times t1 through t3, and is therefore available.

As a result of execution of the system call at time t1, the sequestered sequencer 760a experiences an exception. That is, because the sequencer 760a is sequestered from the operating system 780, it is not permitted to execute instructions, such as system calls, that require operating system 780 service. To handle the exception, the sequencer 760a sends a signal to the OS-visible sequencer 770, and thereby triggers a proxy method at time t2. FIG. 6 illustrates that, at the time the trigger signal is received, the OS-visible core 770 is running a thread, T.

The trigger generated at time t2 is sent to an OS-visible sequencer 770 and triggers execution of a proxy method on an OS-visible sequencer 770, thus interrupting execution of thread T. As is discussed above in connection with FIG. 5, the proxy method may cause the OS-visible sequencer 770 to save its own state, copy the shred state, and then cause the OS-visible sequencer 770 to impersonate the shred, S1, to perform proxy execution of the system call.

FIG. 6 illustrates that, at time 3, the OS-visible sequencer 770 proxy executes the system call to request a lock of the semaphore 740. Because, as is stated above, it is assumed for purposes of this example that the semaphore 740 is available, FIG. 6 illustrates that the OS-visible sequencer acquires a lock on the semaphore 740 at time t4.

As a result of acquiring the lock, the system call impersonated by the OS-visible sequencer 770 is complete after time t4. The proxy method may then cause the OS-visible sequencer 770 to restore states and cause both the sequestered sequencer 760a and the OS-visible sequencer 770 to resume execution of their respective instruction streams (S1 and T, respectively). For at least one embodiment, it is assumed that, having acquired the lock on the semaphore 740, shred S1 begins to execute a critical section of code at such time.

FIG. 6 illustrates that, at time t5 another sequestered sequencer may 760b attempt, for our example, to acquire a lock on the same semaphore 740, while the first sequestered sequencer 760a is still executing the critical section and has not yet released the lock on the semaphore 740.

As is discussed above in connection with time t2, the attempt of the second sequestered sequencer 760b to execute a system call to acquire the semaphore 740 may cause an exception and trigger, at time t6, the proxy execution mechanism.

In response to the trigger sent at time t6, the OS-visible sequencer 770 may, as is described above in connection with time t3, perform proxy execution in order to impersonate the system call for the sequestered sequencer 760b.

FIG. 6 illustrates that, when the OS-visible sequencer 770 attempts to secure a second lock on the semaphore 740, a deadlock occurs at time t8 because the sequencer 770 already holds a lock on the same semaphore 740.

Some OS synchronization objects allow "counting" on a thread-basis. If the same thread attempts to acquire the object more than once it is allowed, but tracked by incrementing a counter value. Typically, the thread is required to release access to the object the same number of times in order to allow other thread acquisitions to succeed. Since the same OS-visible thread may proxy on behalf of more than one shred, this could result in multiple simultaneous shreds accessing an object, which may not have been the intended, resulting in unpredictable operation.

Accordingly, FIG. 6 illustrates an example deadlock situation that may be encountered if embodiments of the proxy method 300 discussed above in connection with FIG. 3 is used to impersonate all system calls for all shreds. Nonetheless, it is sometimes desirable to permit an application programmer to write multi-shredded code that utilizes OS-provided synchronization objects and/or to utilize third-party libraries that utilize OS-provided synchronization objects.

Figure 7:
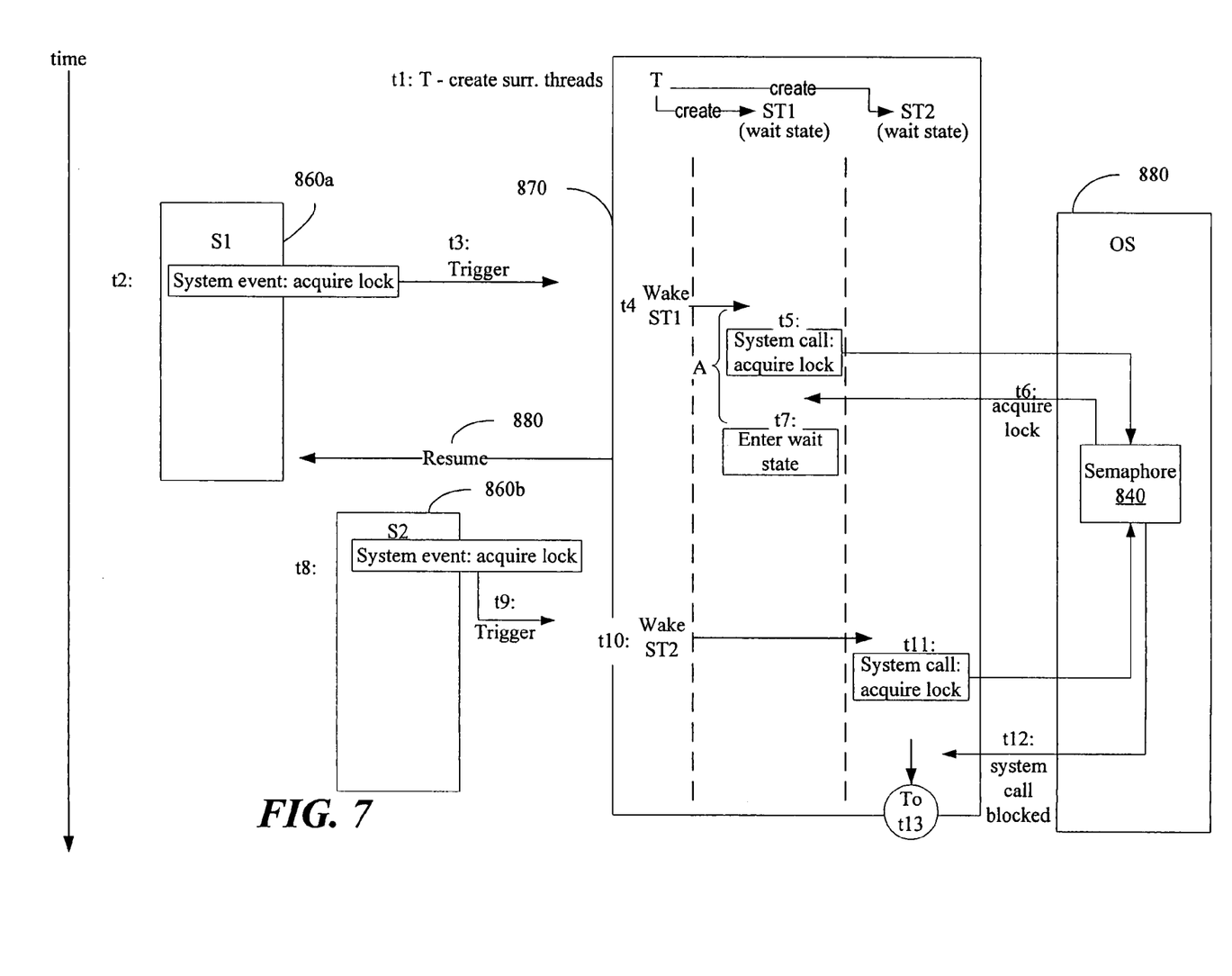
FIGS. 7 and 8 are timing diagrams illustrating an example use of "surrogate threads" to avoid deadlock in a multi-shredded system.

FIG. 7 is a timing diagram illustrating an example of how one or more "surrogate threads" may be utilized to avoid the deadlock situation illustrated by example in FIG. 6. Again, the example illustrated in FIG. 7 assumes asymmetry among sequencers 860a, 860b, 870 of a multi-sequencer system. FIG. 7 illustrates two sequestered sequencers 860a and 860b, each of which is executing a shred instruction stream, S1 and S2, respectively. Each of the shreds S1 and S2 are associated with a thread, T. FIG. 7 illustrates thread T as running on sequencer 870 that is visible to an operating system 880. FIG. 7 further illustrates two surrogate threads, ST1 and ST2. For at least one embodiment, each of the surrogate threads ST1 and ST2 is associated with a distinct shred (S1 and S2, respectively).

The surrogate thread may act as a service agent to a shred when the shred desires OS service. The surrogate thread may be created in response to code written by application programmer; a surrogate thread may run on an OS-visible sequencer and may be scheduled to run by the OS. The surrogate thread may be utilized by the application programmer to handle certain exceptions and system calls from a shred.

Accordingly, as is discussed above, a surrogate thread may be inactive for most of the time and may be "awakened" to perform proxy execution for certain system-level events (such as system faults, system calls, etc.) for a shred. For the embodiment illustrated in FIG. 7, it is assumed that an application programmer will start one surrogate thread for each sequestered sequencer (such as 860a and 860b) that is initialized to execute shred instruction streams associated with the a particular main thread (such as thread T).

FIG. 7 illustrates that, at time t1, instructions in the thread T instruction stream are executed on the OS-visible sequencer 870 in order to create one or more surrogate threads (ST1, ST2). Each surrogate thread ST1, ST2 may be placed into a wait state, until it is triggered in order to perform proxy execution in order to impersonate instructions of an associated shred (S1, S2, respectively).

The actions represented at times t2 and t3 illustrated in FIG. 7 basically correspond the actions represented by, and discussed above in connection with, times t1 and t2 of FIG. 6: attempted system call by a sequestered sequencer 860a, and resultant exception and trigger to OS-visible sequencer 870.

When the OS-visible sequencer 870 receives the trigger for proxy execution, it does not directly provide the proxy execution impersonation (see discussion above in connection with t3 of FIG. 6). Instead, at time t4 the OS-visible sequencer 870 wakes the surrogate thread S1 that is associated with the shred (S1) that generated the trigger so that the surrogate thread ST1 may perform proxy execution for the shred S1.

In response to the wake signal issued at time t4, the surrogate thread ST1 enters an active state. The surrogate thread ST1 remains in the active state during the time period denoted in FIG. 7 as time period "A".

At time t5 the surrogate thread ST1 performs proxy execution to impersonate shred S1 and TO execute the system call in order to request a lock on the semaphore 840. Again, for purposes of the example illustrated in FIG. 7, it assumed that the semaphore 840 is not currently locked and is therefore available. Accordingly, FIG. 7 illustrates that the surrogate thread ST1 acquires a lock on the semaphore 840 at time t6.

As a result of acquiring the lock, the system call impersonated by the OS-visible sequencer 870 is complete after time t6. As is described above in connection with block 508 of FIG. 5, the proxy method may then cause the OS-visible sequencer 870 to restore states and cause the sequestered sequencer 860a to resume 880 execution of shred S1.

For at least one embodiment, it is assumed that, having acquired the lock on the semaphore 840, shred S1 begins to execute a critical section of code at such time. After the impersonation is complete at time t6, the surrogate shred ST1 re-enters the wait state at time t7 to wait for the next event that will trigger proxy execution for shred S1.

For the example illustrated in FIG. 7, another sequestered sequencer 860b attempts, at time t8, to acquire a lock on the same semaphore 840, while the first sequestered sequencer 860a is still executing the critical section and has not yet released the lock on the semaphore 840.

Again, the attempt of the second sequestered sequencer 860b to execute a system call to acquire the semaphore 840 may cause an exception and trigger, at time t9, a proxy execution method. FIG. 7 illustrates that, rather that perform the proxy execution itself, the main thread T on the OS-visible sequencer 870 instead wakes, at time t10, the surrogate thread (ST2) associated with the shred (S2) that generated the trigger at time t9.

The surrogate thread ST2 then impersonates the system call on behalf of the shred S2 at time t11. However, the operating system 880 blocks the system call at time t12 because another thread, ST1, still holds a lock on the semaphore 840. Accordingly, the OS 880 will not schedule surrogate thread ST2 to execute until the first surrogate thread ST1 has released the lock on the semaphore 840. Processing continues at time t13 of FIG. 8.

Figure 8:
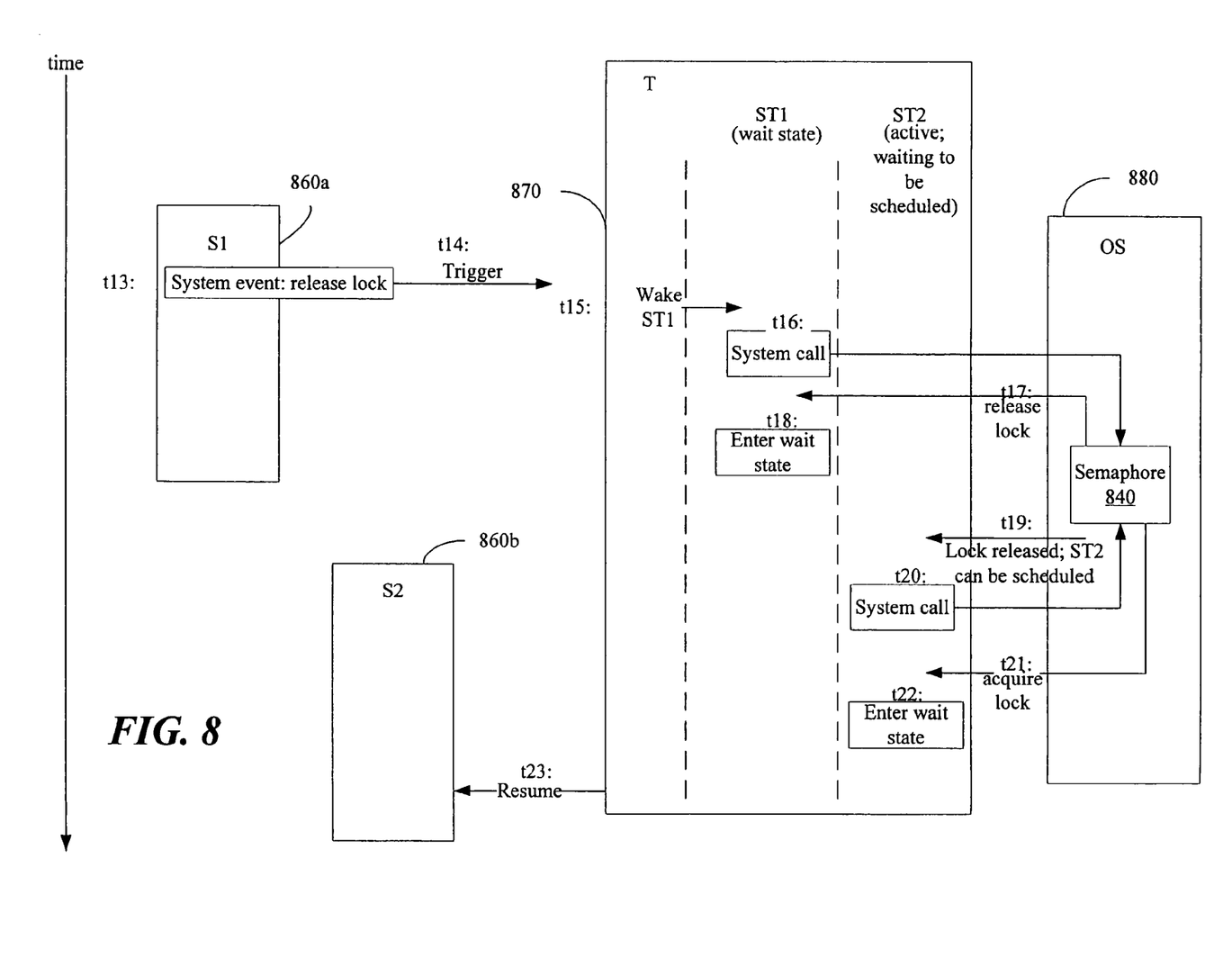

FIG. 8 is a timing diagram that further illustrates the example of "surrogate thread" proxy execution begun in FIG. 7. FIG. 8 illustrates time t13, which occurs after time t12 illustrated in FIG. 7. At such time, t13, the shred S1 has completed execution of the critical section and is ready to release its lock on the semaphore 840. FIG. 8 illustrates that, accordingly, at time t13 the shred S1 attempts to execute a system call to release the lock. As is discussed above in connection with FIG. 7, the sequestered sequencer 860a on which the shred S1 is executing is not permitted to execute system calls. The attempt at time t13 to execute a system call thus causes an exception. In turn, a trigger signal is sent at time t14 from the sequestered sequencer 860a to the OS-visible sequencer 870 in order to request proxy execution for the system call.

FIG. 8 illustrates that, at time t15, the main thread T wakes the surrogate thread, ST1, associated with the shred (S1) that generated the trigger signal. At time t16 the surrogate thread ST1 executes a system call on behalf of the shred S1 in order to release the lock on the semaphore 840. At time t17 the OS releases the lock on the semaphore 840 as a result of the system call performed by the surrogate thread ST1. The proxy execution of the system call having been completed, surrogate thread ST1 re-enters the wait state at time t18.

At time t19, the OS schedules surrogate thread ST2 for execution. When executed, surrogate shred ST2 performs the system call at time t20 in order to acquire a lock on the semaphore 840 on behalf of shred S2 on sequestered sequencer 860b. FIG. 8 illustrates that the lock is acquired at time t21.

After the surrogate thread ST2 has acquired the lock on behalf of the shred, S2, at time t21, proxy execution is complete. Accordingly, the surrogate thread, ST2, re-enters the wait state at time t22 and execution of the shred S2 instruction stream is resumed at time t23. The second sequestered sequencer 860 may now able execute the critical section and the deadlock situation illustrated in FIG. 6 has been avoided via the use of surrogate threads ST1 and ST2. Accordingly, the illustrative example set forth in FIGS. 7 and 8 show that OS-invisible shreds (such as S1 and S2) may masquerade as surrogate threads so that the shreds may make use of OS-provided synchronization objects, while avoiding the deadlock that may occur if a single thread performs proxy execution for multiple shreds.

While FIGS. 7 and 8 and the associated discussion above focus only on an example that illustrates the use of surrogate threads to manage proxy execution among multiple shreds, such illustrative example should not be taken to be limiting.

For an alternative embodiment, surrogate threads may be utilized to minimize deadlock while supporting the use of OS-provided synchronization objects among a main thread and its shreds. For such embodiment, the surrogate thread is not merely invoked to perform system calls on behalf of a shred. Instead, the surrogate thread is invoked upon entry into and exit from the critical section of code being executed on a sequestered sequencer. For such embodiment, the surrogate thread proxy executes the entire section of critical code on behalf of its associated sequestered sequencer, rather than simply impersonating the shred for system calls.

The mechanism and method embodiments and techniques discussed herein may be implemented on any multi-sequencer system, including a single-core SMT system (see, e.g., 310 of FIG. 1) and a multi-core system (see, e.g., 350 of FIG. 1). Further discussion of such systems is discussed below in connection with FIG. 9.

Figure 9:
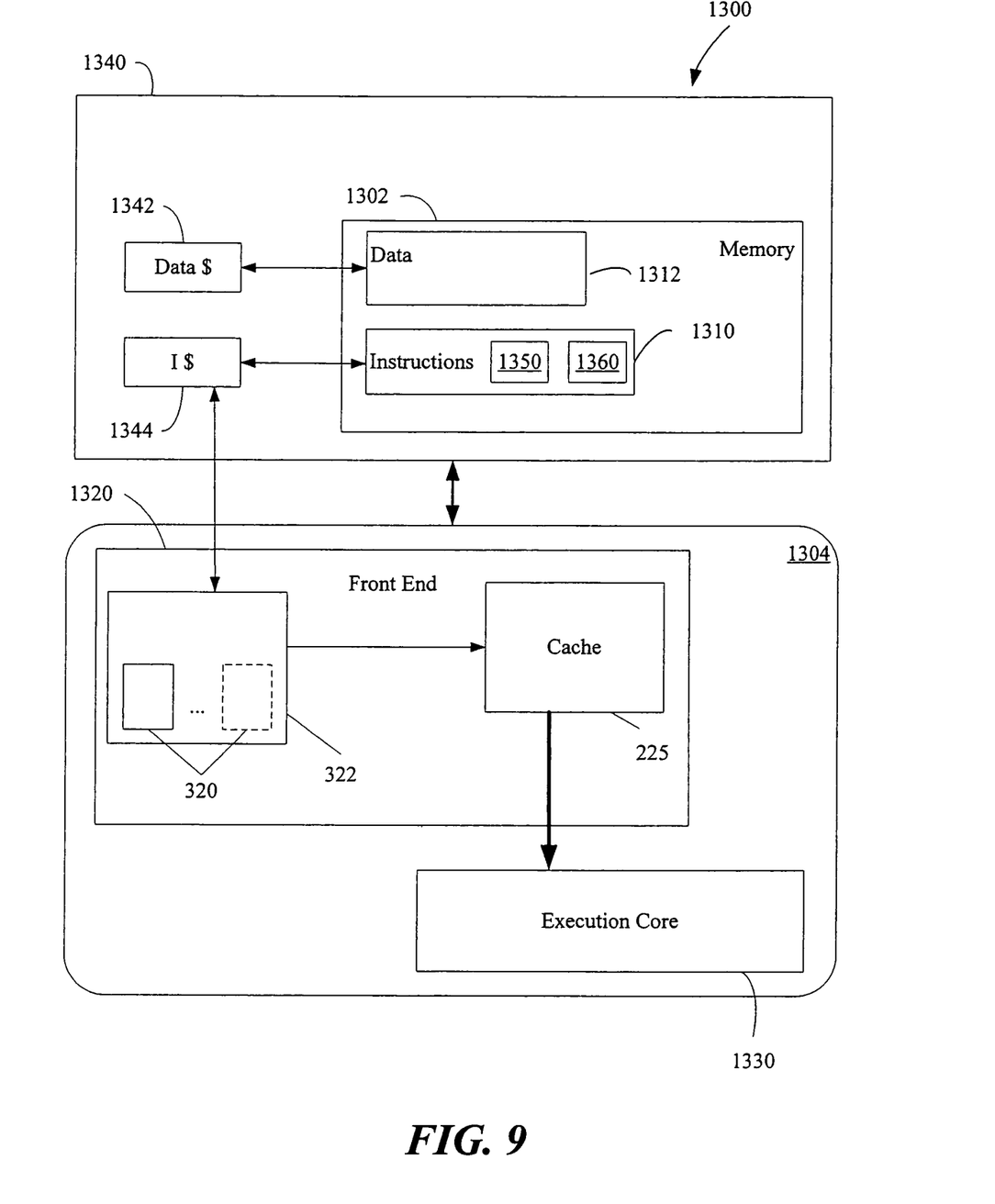
FIG. 9 is a block diagram illustrating at least one embodiment of a system capable of performing disclosed techniques.

FIG. 9 illustrates at least one sample embodiment of a computing system 1300 capable of performing disclosed techniques. The computing system 1300 includes at least one processor core 1304 and a memory system 1340. Memory system 1340 may include larger, relatively slower memory storage 1302, as well as one or more smaller, relatively fast caches, such as an instruction cache 1344 and/or a data cache 1342. The memory storage 1302 may store instructions 1310 and data 1312 for controlling the operation of the processor 1304.

Instructions 1310 may include main thread code 1350. Main thread code 1350 may include instructions to initialize one or more OS-invisible shreds. The initialization instructions of main thread code 1350 may, when executed by a sequencer, cause an OS-invisible sequencer to available to execute a shred instruction stream while sharing the logical execution environment of the main thread.

Main thread code 1350 may include, for at least one embodiment, instructions to generate one or more surrogate threads. The main thread code 135 may also include instructions to perform an embodiment of one or more of the methods 300, 500 or mechanisms discussed above in connection with FIG. 3, 5, 7, 8 or 11.

For at least one embodiment, instructions 1310 may also include a scheduler routine 1360 to schedule shreds for execution on an initialized sequencer.

Memory system 1340 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 1340 may store instructions 1310 and/or data 1312 represented by data signals that may be executed by processor 1304. The instructions 1310 and/or data 1312 may include code and/or data for performing any or all of the techniques discussed herein.

The processor 1304 may include a front end 1320 that supplies instruction information to an execution core 1330. Fetched instruction information may be buffered in a cache 225 to await execution by the execution core 1330. The front end 1320 may supply the instruction information to the execution core 1330 in program order. For at least one embodiment, the front end 1320 includes a fetch/decode unit 322 that determines the next instruction to be executed. For at least one embodiment of the system 1300, the fetch/decode unit 322 may include a single next-instruction-pointer and fetch logic 320. However, in an embodiment where each processor 1304 supports multiple thread contexts, the fetch/decode unit 322 implements distinct next-instruction-pointer and fetch logic 320 for each supported thread context. The optional nature of additional next-instruction-pointer and fetch logic 320 in a multiprocessor environment is denoted by dotted lines in FIG. 13.

Embodiments of the methods described herein may be implemented in hardware, hardware emulation software or other software, firmware, or a combination of such implementation approaches. Embodiments of the invention may be implemented for a programmable system comprising at least one processor, a data storage system (including volatile and non-volatile memory and/or storage elements), at least one input device, and at least one output device. For purposes of this application, a processing system includes any system that has a processor, such as, for example; a digital signal processor (DSP), a microcontroller, an application specific integrated circuit (ASIC), or a microprocessor.

A program may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Sample system 1300 is representative of processing systems based on the Pentium®, Pentium®. Pro, Pentium®. II, Pentium®. III, Pentium®. 4, and Itanium®. and Itanium®. 2 microprocessors available from [[Intel]] Intel® Corporation, although other systems (including personal computers (PCs) having other microprocessors, engineering workstations, personal digital assistants and other hand-held devices, set-top boxes and the like) may also be used. For one embodiment, sample system may execute a version of the Windows® operating system available from Microsoft Corporation, although other operating systems and graphical user interfaces, for example, may also be used.

While particular embodiments of the present invention have been shown and described, it will be obvious to those skilled in the art that changes and modifications can be made without departing from the scope of the appended claims. Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A method, comprising:
generating, in response to a shred to execute on a first thread unit that is not visible to an operating system ("OS"), an OS-visible surrogate thread to run on an OS-visible second thread unit;
executing an instruction of an OS-visible main thread while the shred is concurrently executing on the first thread unit; and
causing the surrogate thread to impersonate the shred to the operating system during handling of an exception in order to trigger an OS service on behalf of the shred,
wherein the impersonating further comprises saving the surrogate thread's current state, copying the shred's current control and state information, and requesting the OS service to use the shred's current state information.

2. The method of claim 1, further comprising:
causing the surrogate thread to impersonate the shred responsive to receiving at the second thread unit a request from the first thread unit to indicate that the shred has attempted to contend for a thread-specific resource that is managed by the operating system.

3. The method of claim 1, further comprising:
causing the surrogate thread to impersonate the shred responsive to receiving at the second thread unit a request from the first thread unit to indicate that the shred has attempted to acquire a lock on a synchronization object managed by the operating system.

4. The method of claim 1, further comprising:
causing the surrogate thread to impersonate the shred responsive to receiving at the second thread unit a request from the first thread unit to indicate that the shred has attempted to write to a user-level exception-handling structure maintained by the operating system.

5. The method of claim 1, wherein:
said generating further comprises generating a plurality of surrogate threads, one each for a plurality of OS-invisible shreds to execute on one or more thread units that are not visible to the operating system.

6. The method of claim 5, wherein:
said executing further comprises executing the instruction of the OS-visible main thread while two or more of the shreds are concurrently executing on one or more thread units that are not visible to the operating system.

7. The method of claim 1, wherein said first and second thread units further comprise separate physical processor cores in a single chip package.

8. An article comprising a non-transitory machine-accessible medium having a plurality of machine accessible instructions, wherein, when the instructions are executed by a processor, the instructions provide for:
generating a first thread to execute on a first thread unit that is visible to an operating system ("OS");
executing an instruction of a main thread while an OS-invisible shred is concurrently executing on a second thread unit that is not visible to the operating system; and
causing the first thread to impersonate the shred to the operating system during handling of an exception incurred by the shred;
wherein said impersonating further comprises saving the first thread's current state, copying the shred's current control and state information, and requesting the OS service to use the shred's current state information.

9. The article of claim 8, further comprising:
instructions that provide for, when executed by a processor, causing the first thread to impersonate the shred responsive to an indicator that the shred has attempted to contend for a thread-specific resource that is managed by the operating system.

10. The article of claim 8, further comprising:
instructions that provide for, when executed by a processor, causing the first thread to impersonate the shred responsive to an indicator that the shred has attempted to contend for a service that is provided by the operating system.

11. The article of claim 8, further comprising:
instructions that provide for, when executed by a processor, causing the first thread to impersonate the shred responsive to an indicator that the shred has attempted to acquire a lock on a synchronization object managed by the operating system.

12. The article of claim 8, further comprising:
instructions that provide for, when executed by a processor, causing the first thread to impersonate the shred responsive to an indicator that the shred has attempted to write to a user-level exception-handling structure maintained by the operating system.

13. The article of claim 8, wherein:
said instructions that provide for generating a first thread further comprise instructions that, when executed by a processor, provide for generating a plurality of OS-visible surrogate threads, one each for a plurality of OS-invisible shreds to execute on one or more second thread units that are not visible to the operating system.

14. The article of claim 8, wherein:
said instructions that provide for causing the first thread to impersonate the shred further comprise instructions that, when executed by a processor, provide for:
saving the state of the first thread; and
copying the state of the shred from the second thread unit to the first thread unit.

15. A method, comprising:
during concurrent execution of an instruction of a main thread that is controlled by an operating system and an instruction on a sequestered sequencer that is not visible to the operating system:
determining that an instruction on the sequestered sequencer has attempted to invoke an operating system service; and causing a surrogate thread executing on a thread unit that is visible to the operating system to invoke the operating system service on behalf of the sequestered sequencer, wherein invoking the operating system service on behalf of the sequestered sequencer further comprises saving the surrogate thread's current state, copying current control and state information of the instruction on the sequestered sequencer, and requesting the OS service to use the copied current state information.

16. The method of claim 15, wherein said determining and said causing are further performed during concurrent execution of: an instruction on a second sequestered sequencer that is not visible to the operating system.

17. The method of claim 15, wherein:
said operating system service further comprises acquisition or release of a synchronization object.

18. The method of claim 15, wherein:
said operating system service further comprises registration of a user-level exception-handling routine.

19. The method of claim 15, wherein:
said operating system service further comprises calling a user-level exception-handling routine.

20. The method of claim 15, wherein:
said determining further comprises receiving a system event generated during execution of the instruction on the sequestered sequencer.

21. An article comprising a non-transitory machine-accessible medium having a plurality of machine accessible instructions, wherein, when the instructions are executed by a processor, the instructions provide for, during concurrent execution of an instruction of a main thread that is controlled by an operating system and an instruction on a sequestered sequencer that is not visible to the operating system:

determining that an instruction on the sequestered sequencer has attempted to invoke an operating system service; and causing a surrogate thread executing on a thread unit that is visible to the operating system to invoke the operating system service on behalf of the sequestered sequencer, wherein invoking the operating system service on behalf of the sequestered sequencer further comprises saving the surrogate thread's current state, copying current control and state information of the instruction on the sequestered sequencer, and requesting the OS service to use the copied current state information.

22. The article of claim 21, wherein said instructions further provide that the instructions that provide for said determining and said causing are further performed during concurrent execution of: an instruction on a second sequestered sequencer that is not visible to the operating system.

23. The article of claim 21, wherein:
said operating system service further comprises acquisition or release of a synchronization object.

24. The article of claim 21, wherein:
said operating system service further comprises registration of a user-level exception-handling routine.

25. The article of claim 24, wherein:
said operating system service further comprises calling the user-level exception-handling routine.

26. The article of claim 21, wherein:
the instructions that provide for said determining further comprise instructions that provide for receiving a system event generated during execution of the instruction on the sequestered sequencer.

* * * * *